H. A. KAUFLIE.
Car Propelling Device.

No. 205,651.  Patented July 2, 1878.

Witnesses:
A. P. Grant,
H. F. Kircher

Inventor:
H. A. Kauflie,
by John A. Wiedersheim
ATTORNEY.

UNITED STATES PATENT OFFICE.

HENRY A. KAUFLIE, OF LANSDALE, PENNSYLVANIA.

IMPROVEMENT IN CAR-PROPELLING DEVICES.

Specification forming part of Letters Patent No. 205,651, dated July 2, 1878; application filed June 6, 1878.

*To all whom it may concern:*

Be it known that I, HENRY A. KAUFLIE, of Lansdale, in the county of Montgomery and State of Pennsylvania, have invented a new and useful Improvement in Propulsion of Cars, &c., which improvement is fully set forth in the following specification and accompanying drawings, in which—

Figure 1:
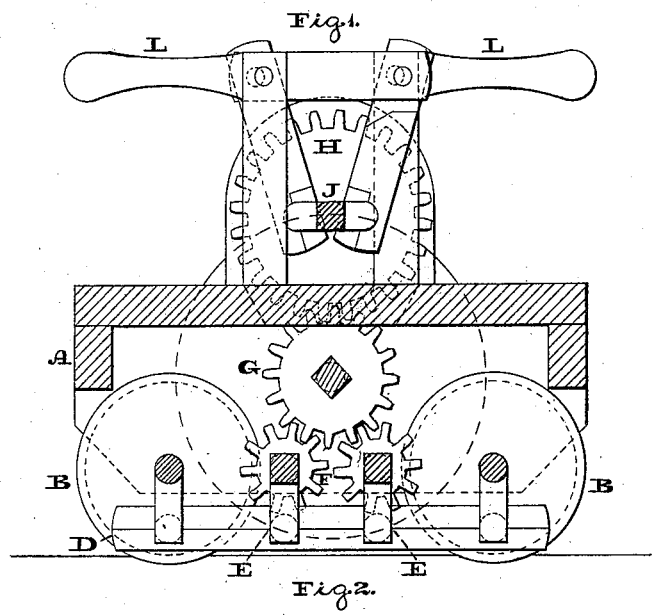
Figure 2:
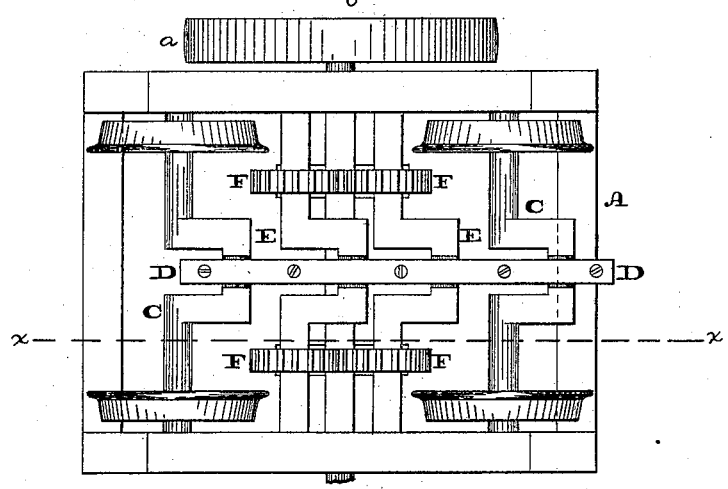
Figure 3:
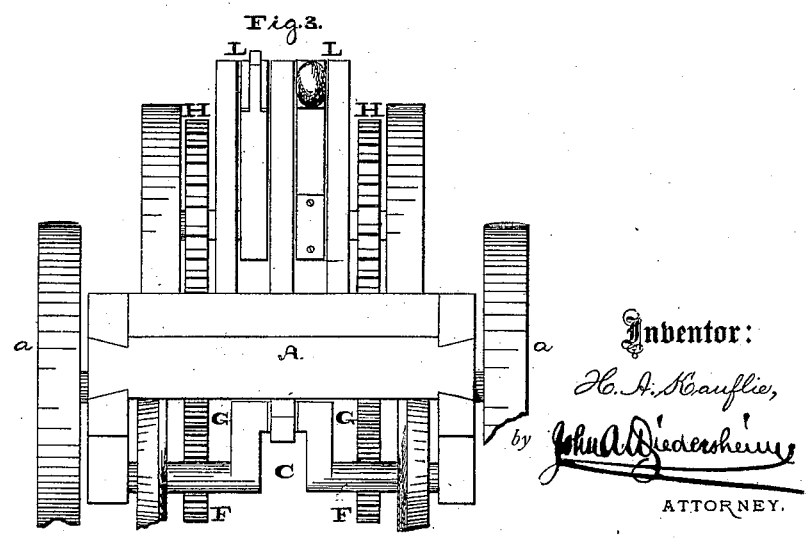

Figure 1 is a longitudinal vertical section of a hand-truck embodying my invention in line $x$ $x$, Fig. 2. Fig. 2 is a bottom view thereof. Fig. 3 is an end view of a portion thereof.

Similar letters of reference indicate corresponding parts in the several figures.

My invention consists of the front and rear wheels of a car, having on their axles centrally-arranged cranks, shafts intermediate of the axles, having centrally-arranged cranks, and a centrally-arranged bar connecting the axles and shafts, whereby power communicated to the bar is exerted on the centers of the axles, and the several parts enumerated are inside of the transverse space of the wheels, said bar thus being free from striking objects outside of the wheels.

It also consists of the combination of levers, wheels, cranks, and a connecting-bar for operating the wheels of a car or other vehicle with ease and rapidity.

Referring to the drawings, A represents the truck of a car, and B its front and rear wheels, having crank-axles C, to which are journaled the ends of a longitudinally-extending connecting bar or rod, D.

E represents two crank-shafts, which are mounted on the sides of the truck A and journaled to the bar D.

To each crank-shaft, on each side of the crank, there are fixed pinions F, which mesh with large pinions G, which, in turn, mesh with larger pinions H, the pinions G being mounted on the truck A, and the pinions H connected to a double-crank shaft, J, properly mounted on the truck A, and standards rising therefrom.

L represents hand-levers mounted on standards on the truck A and connected to the crank-shaft J.

The operation is as follows: When the levers L, or a crank-handle attached to the axis of the wheels H, are operated, rotation is imparted to said wheels H, and consequently to the wheels G and F, and, by means of the connecting-bar D, power is communicated to the wheels of the truck, whereby the car or vehicle is propelled.

It will be noticed that while the pinions F mesh with the pinions G the pinions F of one crank-shaft E do not mesh with the pinions of the other crank-shaft E, but are separated or independent. Consequently the two sets of pinions F rotate in the same direction, and the bar or rod D is operated at two points, thus increasing the ease of operation of said bar. Moreover, the pinions F are of small diameter, and rotate with rapidity, whereby the wheels of the truck will be caused to rotate with rapidity, the advantages of which are evident.

If desired, counterbalance or power wheels $a$ may be attached to the axis of the wheels G.

It will also be seen that the bar D is centrally arranged beneath the truck, and the cranks of the axles C and of the shafts E are likewise arranged centrally. Consequently only a single bar is employed to connect said shafts E and axles C, and the power is exerted on the centers of the axles of the car-wheel. Moreover, the connecting-bar and the several cranks are inside of the transverse space of the wheels, and the bar is free from striking objects outside of the wheels.

Having thus described my invention, what I claim as new, and desire to secure by Letters Patent, is—

1. The combination, with the truck A, of the shafts E, with centrally-arranged cranks, the wheels B, with axles having centrally-arranged cranks, and the centrally-arranged connecting-bar D, substantially as and for the purpose set forth.

2. The pinions G H, crank-shafts E E, having separated pinions F, and the connecting-bar D, in combination with the crank-axles C of the wheels B, substantially as and for the purpose set forth.

3. The levers L, crank-shaft J, pinions H G F, crank-shafts E, and connecting-bar D, in combination with the wheels B, with crank-axles C, substantially as and for the purpose set forth.

HENRY A. KAUFLIE.

Witnesses:
JOHN A. WIEDERSHEIM,
H. E. GARSED.